United States Patent
Chitrapu

(10) Patent No.: US 7,545,780 B2
(45) Date of Patent: Jun. 9, 2009

(54) FLOW-BASED SELECTIVE REVERSE TUNNELING IN WIRELESS LOCAL AREA NETWORK (WLAN)-CELLULAR SYSTEMS

(75) Inventor: Prabhakar R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1074 days.

(21) Appl. No.: 10/294,206

(22) Filed: Nov. 14, 2002

(65) Prior Publication Data
US 2003/0223395 A1 Dec. 4, 2003

Related U.S. Application Data

(60) Provisional application No. 60/383,754, filed on May 28, 2002.

(51) Int. Cl.
*H04W 4/00* (2006.01)
(52) U.S. Cl. .................. 370/338; 370/349; 370/401
(58) Field of Classification Search .................. 370/338, 370/231, 395.3, 349, 401; 455/453, 419, 455/422
See application file for complete search history.

(56) References Cited

U.S. PATENT DOCUMENTS

| | | | |
|---|---|---|---|
| 6,115,615 A | 9/2000 | Ota et al. | |
| 6,122,759 A | 9/2000 | Ayanoglu et al. | |
| 6,480,508 B1 | 11/2002 | Mwikolo et al. | |
| 6,577,613 B1 | 6/2003 | Ramanathan | |
| 6,690,918 B2 | 2/2004 | Evans et al. | |
| 6,965,592 B2 * | 11/2005 | Tinsley et al. | 370/352 |
| 2003/0133421 A1 * | 7/2003 | Sundar et al. | 370/328 |
| 2003/0156566 A1 * | 8/2003 | Griswold et al. | 370/338 |
| 2003/0165156 A1 * | 9/2003 | Zeira | 370/465 |
| 2003/0223395 A1 | 12/2003 | Chitrapu | |

FOREIGN PATENT DOCUMENTS

| | | |
|---|---|---|
| CN | 1228903 | 9/1999 |
| CN | 1228903 A | 9/1999 |
| EP | 1 447 921 | 8/2004 |
| JP | 2001-298776 | 10/2001 |
| JP | 2001298776 | 10/2001 |
| JP | 2001298776 A | 10/2001 |

(Continued)

OTHER PUBLICATIONS

Pahlavan et al., "Handoff in Hybrid Mobile Data Networks," IEEE Personal Communications, IEEE Communications Society, US, vol. 7, Apr. 2000, pp. 2000-2004.*

(Continued)

*Primary Examiner*—George Eng
*Assistant Examiner*—Chuck Huynh
(74) *Attorney, Agent, or Firm*—Volpe and Koenig, P.C.

(57) ABSTRACT

At least one subscriber is subscribed to both a cellular network and a wireless local area network (WLAN). The subscriber is located in the WLAN. Flows of the subscriber are provided for transfer. Each flow comprises packets. For each flow a determination is made on whether that flow is to be routed directly through the WLAN or through both the WLAN and cellular network. Each flow's packets are routed based on that flow's routing determination.

4 Claims, 5 Drawing Sheets

FOREIGN PATENT DOCUMENTS

| | | |
|---|---|---|
| JP | 2001-333126 | 11/2001 |
| JP | 2002-209276 | 7/2002 |
| JP | 2006-033888 | 2/2006 |
| WO | 95/33348 | 12/1995 |
| WO | 98/09455 | 3/1998 |
| WO | 00/18154 | 3/2000 |
| WO | 01/50790 | 7/2001 |
| WO | WO0150790 A | 7/2001 |
| WO | 02/27602 | 4/2002 |
| WO | 03/103311 | 12/2003 |

OTHER PUBLICATIONS

Montenegro et al., "Reverse Tunneling for Mobile IP, Revised," IETF Standard, Internet Engineering Task Force, Jan. 2001, pp. 2001-01.*
Cappiello et al., "Mobility Amongst Heterogeneous Networks With AAA Support," ICC 2002, 2002 IEEE International Conference on Communications, New York, NY, vol. 1 of 5, Apr. 28-May 2, 2002, pp. 2064-2069.
Jee-Young Song et al, "Hybrid Coupling Scheme for UMTS and Wireless LAN Interworking," Vehicular Technology Conference, 2003, IEEE, Piscataway, NJ, US, vol. 4, Oct. 6, 2003, pp. 2247-2251.
Loukola, M.V. et al. "New Possibilities Offered by IPv6", Computer Communications and Networks, 1998. Proceedings, 7th International Conference on Oct. 12-15, 1998.
Pahlavan et al., "Handoff in Hybrid Mobile Data Networks," IEEE Personal Communications, IEEE Communications Society, US, vol. 7, Apr. 2000, pp. 34-46.
Johnson et al. "Mobility Support in IPv6", draft-ietf-mobileip-ipv6-12.txt, Apr. 2000.
Rajahalme et al. "IPv6 Flow Label Specification", draft-ietf-ipv6-flow-label-01.txt, Mar. 2002.
Deering et al. "Internet Protocol, Version 6 (IPv6), Specification", RFC 2460, Dec. 1998.
Takeda et al., "Virtual Private Network Architecture using Dynamic DNS Technology," IEIC Technical Report, Technical Report of the Institute of Electronics, Information and Communication Engineers, vol. 99, No. 675, pp. 25-30 (Mar. 2000).

* cited by examiner

FLOW-BASED SELECTIVE REVERSE TUNNELING IN WIRELESS LOCAL AREA NETWORK (WLAN)-CELLULAR SYSTEMS

This application claims priority to 60/383,754, filed May 28, 2002, which is incorporated by reference as if fully set forth.

BACKGROUND

This invention generally relates to interconnected systems of wireless local area networks (WLANs) and cellular networks. In particular, the invention relates to routing packets within such systems.

FIG. 1 is a simplified illustration of a cellular network 30 and a wireless local area network (WLAN) 22. A subscriber 20 has a subscription to both a WLAN 22 and a cellular network 30. WLANs, such as WLAN 22, are typically used to provide high speed data services to hot spot areas.

The WLAN 22 has a WLAN access point (WLAN-AP) 24 so that the subscriber 20 can access the WLAN 22 and a WLAN access router (WLAN-AR) 26 for routing packets coming into and leaving the WLAN 22, via the Internet 28.

The cellular network 30 has a radio access network 32 so that the subscriber 20 can access the network 30 and a cellular core network 34. The cellular core network 34 has a cellular gateway router 30 for routing packets coming into and leaving the cellular system 30. The cellular core network 34 is also connected to the Internet 28.

For the subscriber 20 to utilize a wireless service, the subscriber 20 either utilizes the cellular system 30 or the WLAN 22. If the subscriber 20 is in the cellular system 30 and not within the WLAN 22, the subscriber 20 makes a wireless connection to the cellular access network 32. Packets are transferred between the cellular access network 32 and the cellular core network 34. The cellular gateway router 36 transfers packets between the cellular core network 34 and the Internet 28. The packets are routed through the Internet 28 to a desired node, such as a destination server.

If the subscriber 20 is within the WLAN 22, the subscriber 20 is considered to be roaming with respect to the cellular network 30. The subscriber 20 makes a wireless connection to the WLAN-AP 24. Packets are transferred between the WLAN-AP 24 and the WLAN-AR 26. The WLAN-AR 26 transfers packets between the WLAN 22 and the Internet 28. The packets are routed through the Internet 28 to/from a desired node.

When a subscriber 20 moves from the cellular network 30 into the WLAN 22, sending packets from the subscriber 20 to the desired node 38 via the WLAN 22 can be performed using standard IP-packet routing tools. The desired node 38 has not moved. However, sending IP-packets from the desired node 38 to the subscriber 20 via the WLAN 22 is more problematic. If the subscriber 20 has a static IP address, the network ID of the subscriber's IP address is still the same as the network ID of the IP address of the router 36 of the cellular network 30.

Mobile IP versions 4 (MobileIPv4) and 6 (MobileIPv6) provide solutions to this problem. In MobileIPv4,the subscriber informs the cellular gateway router of its new location. These additional functions of the cellular gateway router and the WLAN-AR are referred to as Home Agent and Foreign Agent functions. When the cellular gateway router 36 receives the subscriber's packets from the desired node 38, the router 36 forwards them to the WLAN-AR 26. The WLAN-AR 26 sends the packets to the IP address of the subscriber 20 using layer 2 address mapping procedures, such as ARP.

A drawback with this approach is that packets originating from the subscriber 20 going through the WLAN 22 are not visible to the cellular network 30 or router 36. Another drawback with this approach is the increased loading on the cellular gateway router 36, due to the routing of all the subscriber's incoming packets.

In MobileIPv6,the subscriber 20 sends a binding update to the cellular gateway router 36 and the desired node 38. The binding update has information about the new network (WLAN 22) that the subscriber 20 is attached to. The IP packets from the destination node 38 are now routed directly to the subscriber 20 bypassing the cellular gateway router 36 and using standard IP routing protocols. A drawback with this approach is that packets originating from and going to the subscriber are not visible to the cellular network.

In some cases, it is undesirable that the IP packets are not visible to the cellular network 30. One reason is the security protocols of the cellular system 30 are circumvented. Additionally, certain services of the cellular system 30 can not be utilized, such as access to the cellular network's packet services.

To allow all of the subscriber packets to be visible to the cellular network 30, reverse and/or forward tunneling can be used. As shown in FIG. 2, in reverse tunneling, the packets from the subscriber 20 in the WLAN 22 are routed through both the WLAN 22 and the cellular network 30. Packets are transferred between the routers (cellular gateway router 36 and WLAN-AR 26) via an IP network 29. Reverse tunneling is supported by Mobile IPv4 and it allows all of the packets to be visible to the cellular network 30.

For MobileIPv6,both forward and reverse tunneling are needed to make the packets visible to the cellular network 30. In forward tunneling, the packets are also routed through both the cellular network 30 and the WLAN 22.

By routing all the packets through the cellular gateway router 36, the cellular system 30 can maintain security and provide cellular network based packet services to the subscriber 20, even when located in WLAN 22. To illustrate, the cellular gateway router 36 may send packets to a screening/monitoring agent for security purposes. One drawback to both these approaches is that the loading on the cellular gateway router is increased.

To reduce the routing on the cellular gateway router 36, selective reverse tunneling may be used. In selective reverse tunneling, packets are either selectively routed through both the cellular network 30 and the WLAN 22 or only through the WLAN 22, on a packet by packet basis. Such packet by packet routing is undesirable, since it increases the processing load. Furthermore, such packet level granularity may not be needed for most applications.

Accordingly, it is desirable to have alternate approaches to cellular network and WLAN routing.

SUMMARY

At least one subscriber is subscribed to both a cellular network and a wireless local area network (WLAN). The subscriber is located in the WLAN. Flows of the subscriber are provided for transfer. Each flow comprises packets. For each flow a determination is made on whether that flow is to be routed directly through the WLAN or through both the WLAN and cellular network. Each flow's packets are routed based on that flow's routing determination.

BRIEF DESCRIPTION OF THE DRAWING(S)

DETAILED DESCRIPTION OF THE PREFERRED EMBODIMENT(S)

Figure 1:
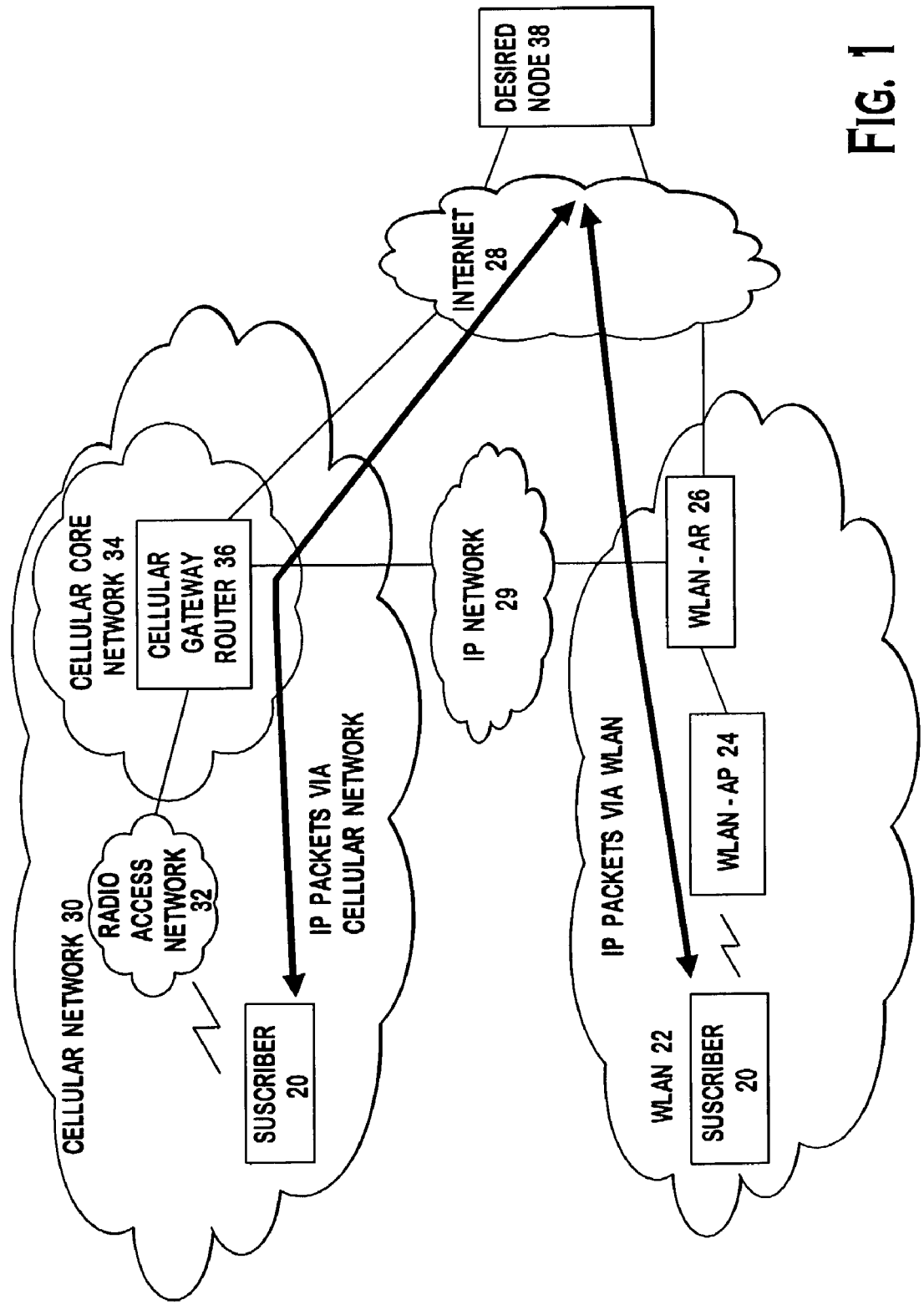
FIG. 1 is an illustration of a cellular network and a WLAN.
Figure 2:
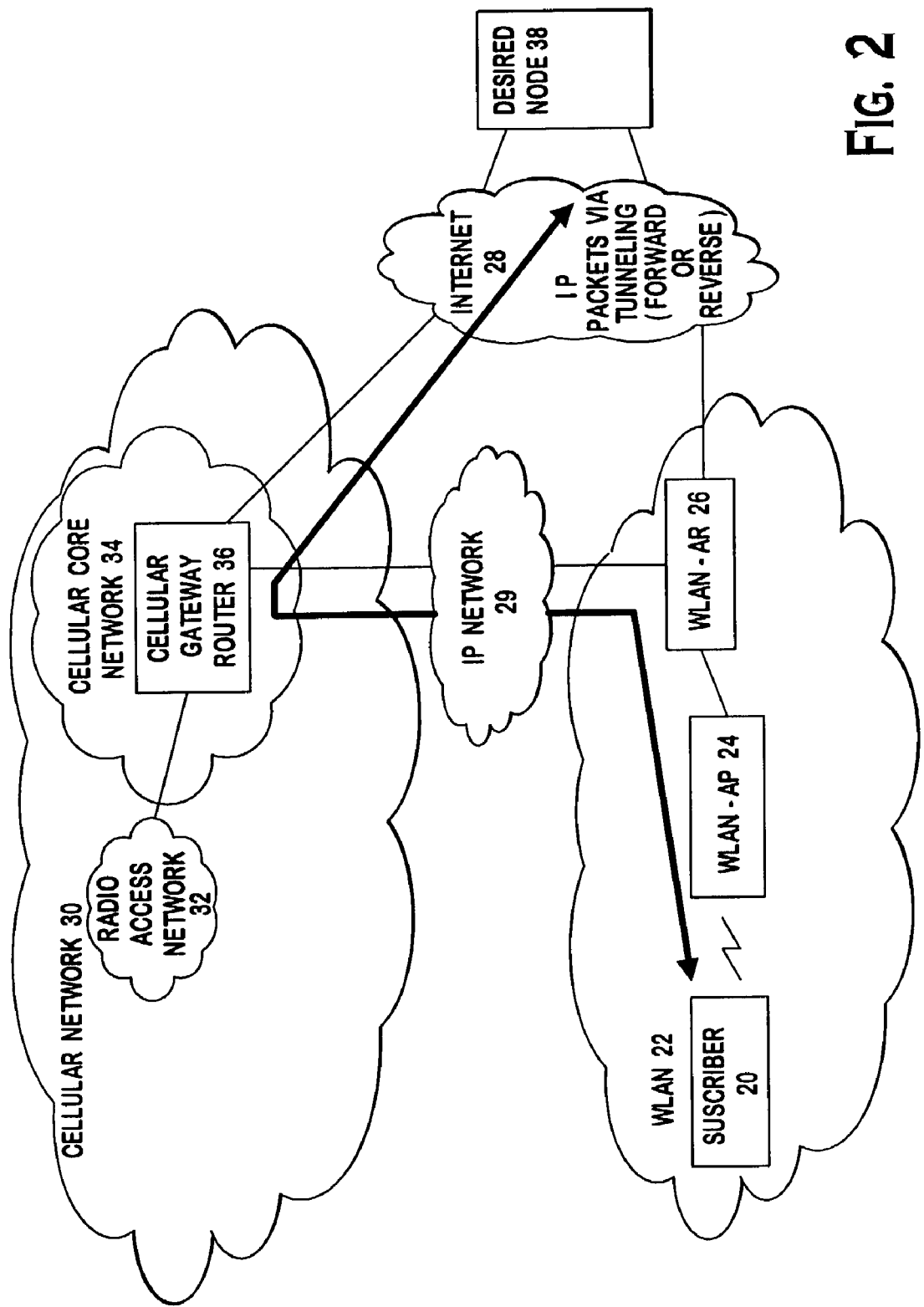
FIG. 2 is an illustration of reverse and forward tunneling.
Figure 3:
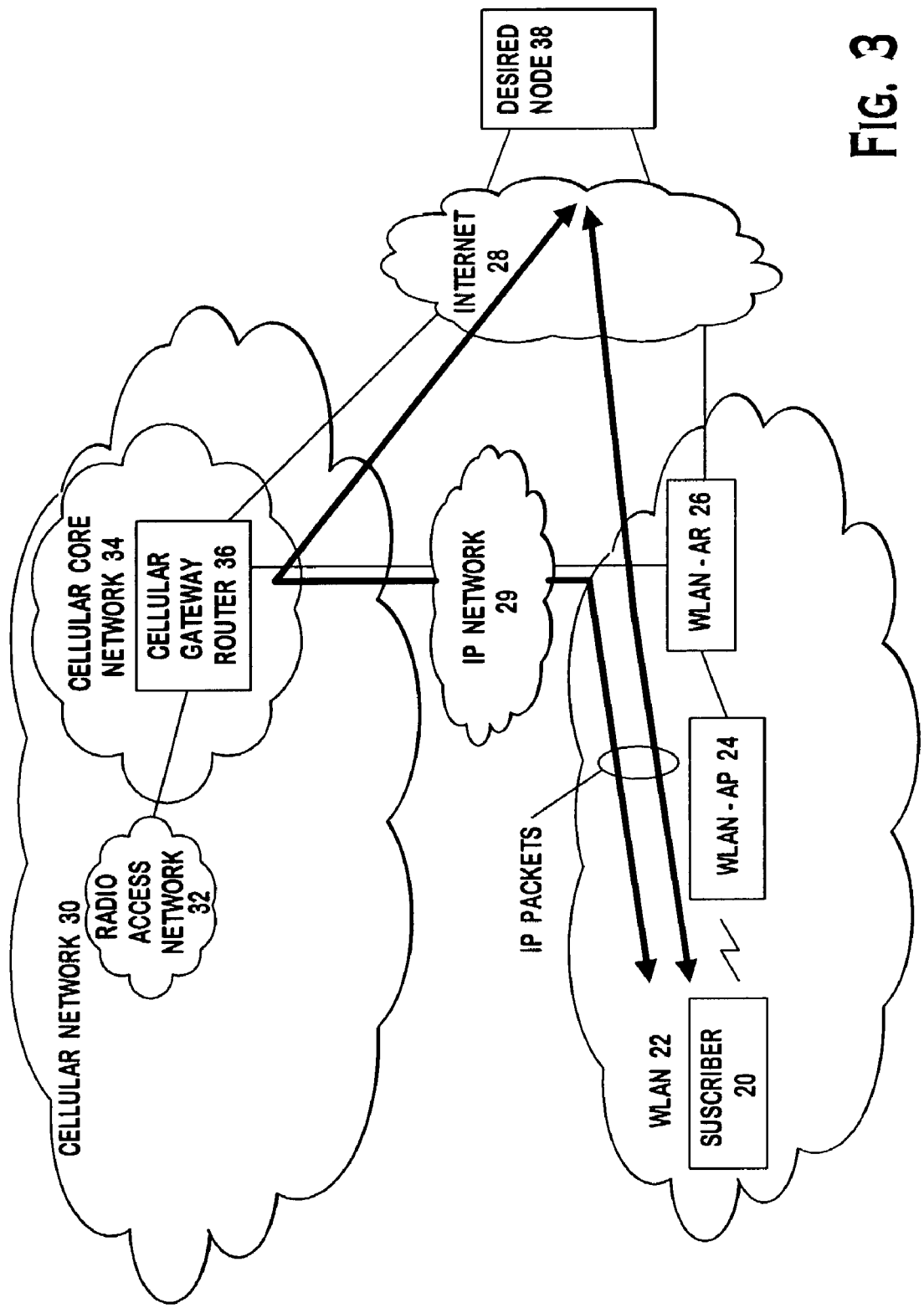
FIG. 3 is an illustration of selective reverse tunneling on a flow basis.

FIG. 3 is an embodiment of flow-based reverse tunneling. On a flow by flow basis, packets are selectively either routed directly through the WLAN 22 to the subscriber 20 or through the cellular network 30 to the WLAN 22 to the subscriber 20 as shown in FIG. 3. A flow of packets is defined by a 5-tuple. The 5-tuple is a source IP address, a destination IP address, a source port, a destination port and a transport protocol type. An alternate manner of characterizing a flow uses a 3-tuple. The 3-tuple has a Flow-label, a source IP address and a destination IP address. Each flow is typically a distinct session, such as a distinct TCP/IP session. The flows traditionally are used to differentiate between quality of service (QOS) treatment between flows.

The operator of the cellular network 30 and/or the subscriber 20 determines which flows are to be routed via the cellular network 30 or directly to the WLAN 22. One approach to make this determination is by the type of flow. To illustrate, the operator may decide to have all flows associated with instant messaging sent directly through the WLAN 22, reducing traffic in the cellular system 30. The operator may also decide to have all flows associated with email sent via the cellular network 30.

Alternately, the flow routing determination may be based on the cellular network traffic. If the cellular network 30 has a low loading all of the traffic is routed via the cellular network 30. As traffic increases, specific types of flows are routed directly through the WLAN 22. This flow transfer may be based on several priority levels. To illustrate, the loading on the cellular network 30 increases from a low loading to a moderate loading. At the moderate loading, a first set of flow types, such as instant messaging, are routed directly through the WLAN 22. At a high loading, a first set, such as instant messaging, and a second set, such as Internet browsing, are routed through the WLAN 22.

Figure 4:
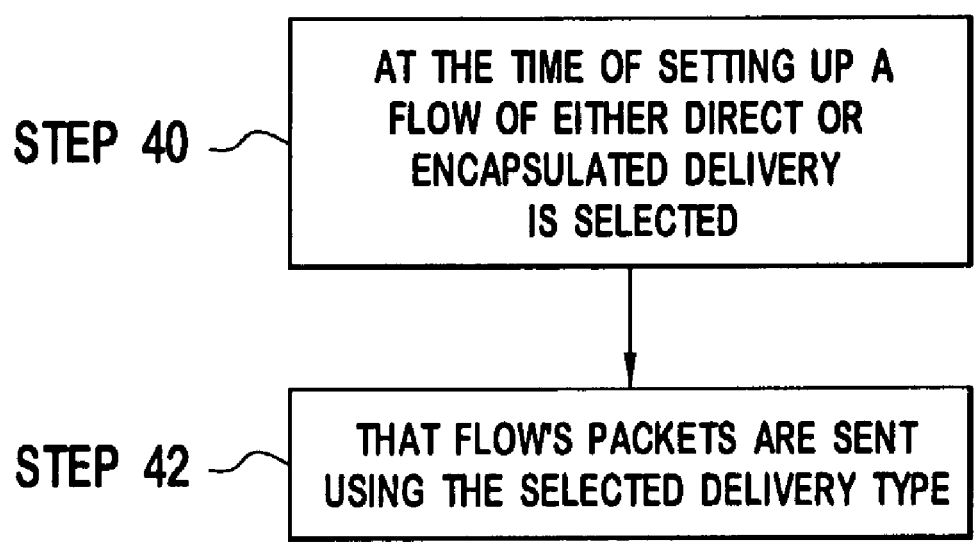
FIG. 4 is a flow chart of selective flow-based reverse tunneling using direct and encapsulated delivery.

One approach to selectively direct the flows from the subscriber 20 to desired node 38 uses direct delivery and encapsulated delivery styles as shown in FIG. 4. In direct delivery, the packets associated with a flow are sent directly through the WLAN 22. In encapsulated delivery, the packets associated with the flow are reverse tunneled, sent through the cellular system 30 and WLAN 22. An encapsulated packet encapsulates the packet having WLAN routing information with extra information for routing through the cellular network 30. One drawback to encapsulation is the extra overhead involved. At the time the subscriber 20 sets up a flow, either direct or encapsulated delivery is selected, step 40. After registration, the flow's packets are sent using the selected delivery type, step 42.

Figure 5:
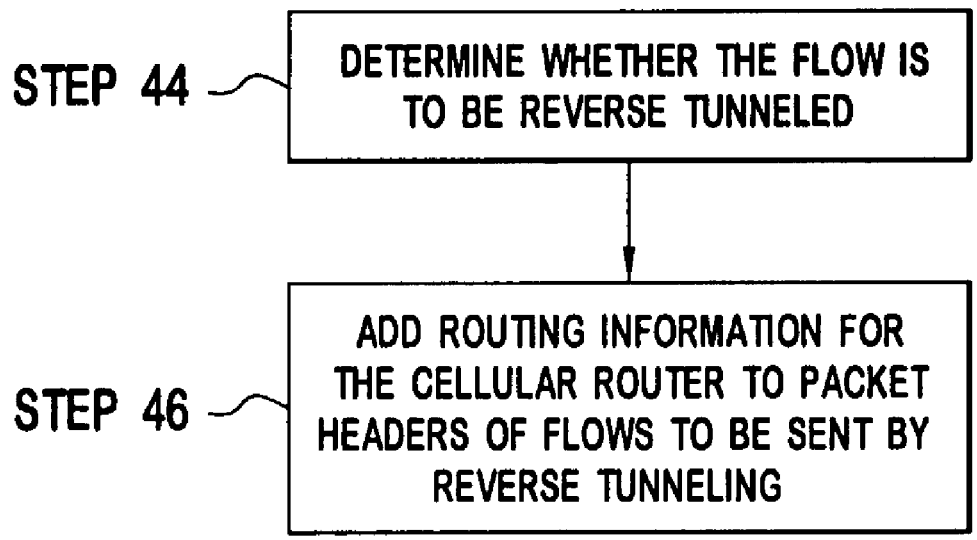
FIG. 5 is a flow chart of selective flow-based reverse tunneling by adding routing information to packet headers.

Another approach is to use routing headers, such as defined in the MobileIPv6. Routing headers allow an IP packet to be routed through specified intermediate nodes (routers). As shown in the flow chart of FIG. 5, after determining if reverse tunneling is to be performed, step 44, the packets of flows to be reversed tunneled are routed via the intermediate cellular gateway router 36 of the cellular network 30 by adding the routing information to the header, step 46. Packets not to be reverse tunneled are routed normally, such as using the standard route optimization of MobileIPv6.

Figure 6:
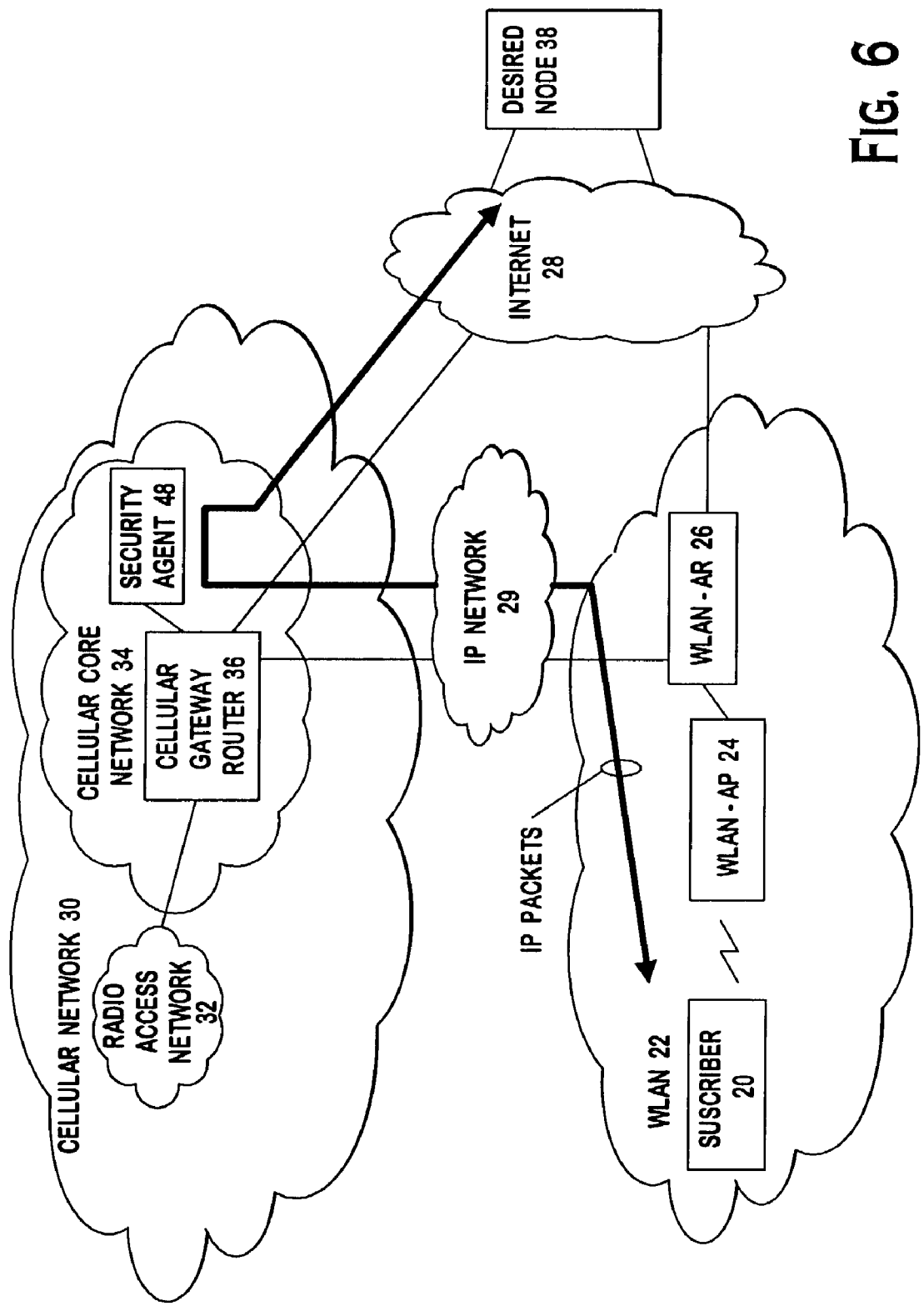
FIG. 6 is an illustration of routing to a secret agent using intermediate routing.

Alternately, in addition to selectively routing reverse tunneled packets through the cellular gateway router 36, this technique may be extended to add other intermediate nodes, such as a security agent 48 of the cellular system 30. To illustrate as shown in FIG. 6, the packets of certain flows may be routed through the security agent 48 of the cellular network 30.

What is claimed is:

1. A method for a subscriber unit capable of operating in a cellular network and a wireless local area network (WLAN), configured to perform:

receiving an indication of a classification of a first group of selected transmission control protocol/internet protocol (TCP/IP) sessions and a second group of TCP/IP sessions, wherein the first group and the second group are classified based on type of flow;

for packets of the first group of selected TCP/IP sessions, transferring those packets by encapsulated delivery to a desired node on the Internet via cellular network and the WLAN by inserting into a header of those packets routing information to a specified node in the cellular network, while the cellular network and the WLAN are connected to the Internet, wherein packets are transferred to a desired node on the Internet via the WLAN;

for packets of a second group of selected TCP/IP sessions, transferring those packets directly to a desired node on the Internet via the WLAN, without routing through the cellular network, wherein the packets of the first group and the packets of the second group are defined by a source IP address, a destination IP address, a source port, a destination port, and a transport protocol type; and receiving an indication of a priority level of a traffic loading, wherein a packet data session is directly routed through the WLAN if the traffic loading is high and the packet data session is routed through the WLAN and the cellular network if the traffic loading is low.

2. The subscriber unit of claim 1 wherein each packet data session differentiates between quality of service treatment.

3. A method for routing packets between a subscriber unit and a desired node on the Internet, the subscriber unit configured to subscribe to both a cellular network and a wireless local area network (WLAN) comprising:

determining a traffic loading for the cellular network while both the cellular network and the WLAN are connected to the Internet, wherein packets are routed between the subscriber unit and the node via the WLAN and the cellular network;

classifying the determined traffic loading into high or low priority levels, wherein determining types of packet data sessions for direct routing through the WLAN is based on the classified priority level of the determined traffic loading;

if traffic loading is high, direct routing through the WLAN;

if traffic loading is low, routing through the WLAN and the cellular network;

wherein all packets are defined by a source IP address, a destination IP address, a source port, a destination port, and a transport protocol type;

for packets of the subscriber unit for directly routed packet data sessions, routing those packets directly through the WLAN;

for packets of the subscriber unit for non-directly routed packet data sessions, routing those packets through the cellular network and the WLAN;

classifying selected transmission control protocol/internet protocol (TCP/IP) sessions into a first group of TCP/IP sessions and a second group of TCP/IP sessions, wherein the first group and second group are classified based on type of flow; and sending an indication of the classification of the first group of TCP/IP sessions and the second group of TCP/IP sessions.

4. The method of claim 3 wherein the types of packet data sessions differentiate between quality of service treatment.

* * * * *